(12) United States Patent
Koch

(10) Patent No.: US 9,665,078 B2
(45) Date of Patent: *May 30, 2017

(54) SYSTEM FOR PROPAGATING MESSAGES FOR PURPOSES OF DEMAND RESPONSE

(71) Applicant: Honeywell International Inc., Morristown, NJ (US)

(72) Inventor: Edward Koch, San Rafael, CA (US)

(73) Assignee: Honeywell International Inc., Morris Plains, NJ (US)

(*) Notice: Subject to any disclaimer, the term of this patent is extended or adjusted under 35 U.S.C. 154(b) by 487 days.

This patent is subject to a terminal disclaimer.

(21) Appl. No.: 14/224,744

(22) Filed: Mar. 25, 2014

(65) Prior Publication Data

US 2015/0277400 A1  Oct. 1, 2015

(51) Int. Cl.
   *G06F 15/16* (2006.01)
   *G05B 15/02* (2006.01)
   *H04L 29/08* (2006.01)

(52) U.S. Cl.
   CPC .............. *G05B 15/02* (2013.01); *H04L 67/12* (2013.01); *H04L 67/28* (2013.01)

(58) Field of Classification Search
   CPC ....................................................... H04L 67/10
   USPC ...................................................... 709/223
   See application file for complete search history.

(56) References Cited

U.S. PATENT DOCUMENTS

| | | |
|---|---|---|
| 4,110,827 A | 8/1978 | Shavit |
| 4,130,874 A | 12/1978 | Pai |
| 4,153,936 A | 5/1979 | Scmitz et al. |
| 4,419,667 A | 12/1983 | Gurr et al. |
| 4,850,010 A | 7/1989 | Stanbury et al. |
| 4,937,760 A | 6/1990 | Beitel et al. |
| 5,341,142 A | 8/1994 | Reis et al. |
| 5,500,561 A | 3/1996 | Wilhelm |
| 5,566,084 A | 10/1996 | Cmar |

(Continued)

FOREIGN PATENT DOCUMENTS

| | | |
|---|---|---|
| EP | 2456227 | 5/2012 |
| JP | 2012118982 | 6/2012 |

(Continued)

OTHER PUBLICATIONS

U.S. Appl. No. 14/526,193, filed Oct. 28, 2014.

(Continued)

*Primary Examiner* — Adnan Mirza
(74) *Attorney, Agent, or Firm* — Seager, Tufte & Wickhem, LLP

(57) ABSTRACT

A system having a utility, a communications intermediary and demand response resources. The utility may be connected to the communications intermediary via a network. The demand response resources may be connected to the communications intermediary via another network. A single dispatch destined for the demand response resources may be sent to the communications intermediary. The dispatch may be disaggregated at the communications intermediary into a multitude of dispatches which may be dispersed to their respective destined demand response resources. The demand response resources may send telemetries to the communications intermediary that aggregates the telemetries into a single telemetry. The single telemetry may be sent to the utility.

20 Claims, 4 Drawing Sheets

(56) References Cited

U.S. PATENT DOCUMENTS

| | | |
|---|---|---|
| 5,572,438 A | 11/1996 | Ehlers et al. |
| 5,598,349 A | 1/1997 | Elliason et al. |
| 5,719,854 A | 2/1998 | Choudhury et al. |
| 5,822,553 A | 10/1998 | Gifford et al. |
| 5,892,758 A | 4/1999 | Argyroudis |
| 6,026,375 A | 2/2000 | Hall et al. |
| 6,195,367 B1 | 2/2001 | Jakobik et al. |
| 6,209,018 B1 | 3/2001 | Ben-Shachar et al. |
| 6,252,950 B1 | 6/2001 | Duty et al. |
| 6,259,723 B1 | 7/2001 | Miyashita |
| 6,278,717 B1 | 8/2001 | Arsenault et al. |
| 6,289,384 B1 | 9/2001 | Whipple et al. |
| 6,366,926 B1 | 4/2002 | Pohlmann et al. |
| 6,446,136 B1 | 9/2002 | Pohlmann et al. |
| 6,519,509 B1 | 2/2003 | Nierlich et al. |
| 6,529,723 B1 | 3/2003 | Bentley |
| 6,535,817 B1 | 3/2003 | Krishnamurti |
| 6,566,926 B1 | 5/2003 | Patterson |
| 6,574,581 B1 | 6/2003 | Bohrer et al. |
| 6,758,161 B2 | 7/2004 | Nohynek |
| 6,832,249 B2 | 12/2004 | Ciscon et al. |
| 6,857,022 B1 | 2/2005 | Scanlan |
| 6,865,685 B2 | 3/2005 | Hammond et al. |
| 6,985,087 B2 | 1/2006 | Soliman |
| 7,010,700 B1 | 3/2006 | Foss et al. |
| 7,016,784 B2 | 3/2006 | Allen et al. |
| 7,039,532 B2 | 5/2006 | Hunter |
| 7,069,309 B1 | 6/2006 | Dodrill et al. |
| 7,183,910 B2 | 2/2007 | Alvarez et al. |
| 7,260,616 B1 | 8/2007 | Cook |
| 7,333,880 B2 | 2/2008 | Brewster et al. |
| 7,337,237 B2 | 2/2008 | Salahshoor et al. |
| 7,346,467 B2 | 3/2008 | Bohrer et al. |
| 7,392,115 B2 | 6/2008 | Schindler |
| 7,401,086 B2 | 7/2008 | Chorafakis et al. |
| 7,472,301 B2 | 12/2008 | Ginggen et al. |
| 7,528,503 B2 | 5/2009 | Rognli et al. |
| 7,565,227 B2 | 7/2009 | Richard et al. |
| 7,590,746 B2 | 9/2009 | Slater et al. |
| 7,650,289 B2 | 1/2010 | Cooper et al. |
| 7,676,657 B2 | 3/2010 | Lindholm et al. |
| 7,702,424 B2 | 4/2010 | Cannon et al. |
| 7,715,951 B2 | 5/2010 | Forbes, Jr. et al. |
| 7,742,953 B2 | 6/2010 | King et al. |
| 7,775,191 B2 | 8/2010 | Hou |
| 7,778,738 B2 | 8/2010 | Taft |
| 7,797,009 B2 | 9/2010 | Kiiskila et al. |
| 7,806,845 B2 | 10/2010 | Arm et al. |
| 7,844,481 B2 | 11/2010 | Hilbush et al. |
| 7,845,576 B2 | 12/2010 | Siddaramanna et al. |
| 7,865,252 B2 | 1/2011 | Clayton |
| 7,873,441 B2 | 1/2011 | Synesiou et al. |
| 7,885,718 B2 | 2/2011 | Yano et al. |
| 7,886,166 B2 | 2/2011 | Shnekendorf et al. |
| 7,925,384 B2 | 4/2011 | Huizenga et al. |
| 7,941,528 B2 | 5/2011 | Hicks, III et al. |
| 7,954,726 B2 | 6/2011 | Siddaramanna et al. |
| 7,958,229 B2 | 6/2011 | Conway |
| 8,023,410 B2 | 9/2011 | O'Neill |
| 8,073,558 B2 | 12/2011 | Koch et al. |
| 8,091,794 B2 | 1/2012 | Siddaramanna et al. |
| 8,140,279 B2 | 3/2012 | Subbloie |
| 8,140,658 B1 | 3/2012 | Gelvin et al. |
| 8,143,811 B2 | 3/2012 | Shloush et al. |
| 8,163,276 B2 | 4/2012 | Hedrick et al. |
| 8,170,774 B2 | 5/2012 | Forte et al. |
| 8,183,995 B2 | 5/2012 | Wang et al. |
| 8,199,773 B2 | 6/2012 | Aubin et al. |
| 8,232,745 B2 | 7/2012 | Chemel et al. |
| 8,234,017 B2 | 7/2012 | Ahn |
| 8,234,876 B2 | 8/2012 | Parsonnet et al. |
| 8,260,468 B2 | 9/2012 | Ippolito et al. |
| 8,260,469 B2 | 9/2012 | Gregory et al. |
| 8,260,650 B2 | 9/2012 | Miller |
| 8,291,243 B2 | 10/2012 | Castelli et al. |
| 8,295,989 B2 | 10/2012 | Rettger et al. |
| 8,305,380 B2 | 11/2012 | Gotwalt et al. |
| 8,312,299 B2 | 11/2012 | Tremel et al. |
| 8,321,302 B2 | 11/2012 | Bauer et al. |
| 8,321,950 B2 | 11/2012 | Oran |
| 8,327,024 B2 | 12/2012 | Pattison et al. |
| 8,330,762 B2 | 12/2012 | Grossman |
| 8,352,094 B2 | 1/2013 | Johnson et al. |
| 8,373,547 B2 | 2/2013 | Benya et al. |
| 8,386,086 B2 | 2/2013 | Roux et al. |
| 8,406,937 B2 | 3/2013 | Verfuerth et al. |
| 8,412,654 B2 | 4/2013 | Montalvo |
| 8,417,391 B1 | 4/2013 | Rombouts et al. |
| 8,443,355 B2 | 5/2013 | Wiese et al. |
| 8,565,903 B2 | 10/2013 | Koch et al. |
| 8,595,094 B1 | 11/2013 | Forbes, Jr. |
| 8,621,097 B2 | 12/2013 | Venkatakrishnan et al. |
| 8,626,354 B2 | 1/2014 | Walter et al. |
| 8,630,744 B2 | 1/2014 | Walter et al. |
| 8,639,214 B1 | 1/2014 | Fujisaki |
| 8,676,273 B1 | 3/2014 | Fujisaki |
| 8,676,953 B2 | 3/2014 | Koch |
| 8,700,187 B2 | 4/2014 | Forbes, Jr. |
| 8,782,190 B2 | 7/2014 | Koch |
| 8,868,925 B2 | 10/2014 | Wyatt et al. |
| 8,879,488 B2 | 11/2014 | Pavlovski et al. |
| 9,183,522 B2 | 11/2015 | Koch |
| 2003/0016237 A1 | 1/2003 | Hickey |
| 2003/0033230 A1 | 2/2003 | Mccall |
| 2003/0069752 A1 | 4/2003 | LeDain et al. |
| 2003/0233064 A1 | 12/2003 | Arm et al. |
| 2004/0034484 A1 | 2/2004 | Solomita, Jr. et al. |
| 2004/0137897 A1 | 7/2004 | Teixeira |
| 2004/0203649 A1 | 10/2004 | Cashiola |
| 2005/0027636 A1 | 2/2005 | Gilbert et al. |
| 2005/0152694 A1* | 7/2005 | Chown ............... H04B 10/077 398/30 |
| 2005/0172304 A1 | 8/2005 | Tavares et al. |
| 2005/0194456 A1 | 9/2005 | Tessier et al. |
| 2005/0229220 A1 | 10/2005 | Fisher et al. |
| 2005/0262026 A1 | 11/2005 | Watkins |
| 2007/0005195 A1 | 1/2007 | Pasquale et al. |
| 2007/0055999 A1 | 3/2007 | Radom et al. |
| 2007/0222295 A1 | 9/2007 | Wareham et al. |
| 2008/0011864 A1 | 1/2008 | Tessier et al. |
| 2008/0046715 A1 | 2/2008 | Balazs et al. |
| 2008/0114638 A1 | 5/2008 | Colliau et al. |
| 2008/0167931 A1 | 7/2008 | Gerstemeier et al. |
| 2008/0177678 A1* | 7/2008 | Di Martini ............ G01D 4/002 705/412 |
| 2008/0255760 A1 | 10/2008 | Rojicek et al. |
| 2008/0262848 A1 | 10/2008 | Shienbrood et al. |
| 2009/0046625 A1 | 2/2009 | Diener et al. |
| 2009/0093916 A1* | 4/2009 | Parsonnet ............ F24F 5/0017 700/286 |
| 2009/0187499 A1 | 7/2009 | Mulder et al. |
| 2009/0198384 A1 | 8/2009 | Ahn |
| 2009/0204977 A1 | 8/2009 | Tavares et al. |
| 2009/0249090 A1 | 10/2009 | Schmitz et al. |
| 2009/0271255 A1 | 10/2009 | Utter et al. |
| 2009/0281674 A1 | 11/2009 | Taft |
| 2009/0295594 A1 | 12/2009 | Yoon |
| 2009/0297488 A1 | 12/2009 | Fraser et al. |
| 2009/0313083 A1 | 12/2009 | Dillon et al. |
| 2009/0319090 A1 | 12/2009 | Dillon et al. |
| 2009/0326726 A1* | 12/2009 | Ippolito ................ H02J 3/14 700/291 |
| 2010/0057480 A1 | 3/2010 | Arfin et al. |
| 2010/0076615 A1 | 3/2010 | Daniel et al. |
| 2010/0076835 A1 | 3/2010 | Silverman |
| 2010/0106342 A1 | 4/2010 | Ko et al. |
| 2010/0106543 A1 | 4/2010 | Marti |
| 2010/0114340 A1 | 5/2010 | Huizenga et al. |
| 2010/0138363 A1 | 6/2010 | Batterberry et al. |
| 2010/0168924 A1 | 7/2010 | Tessier et al. |
| 2010/0274377 A1 | 10/2010 | Kaufman et al. |
| 2010/0283606 A1 | 11/2010 | Tsypin et al. |
| 2010/0324962 A1 | 12/2010 | Nesler et al. |
| 2011/0016200 A1 | 1/2011 | Koch |

(56) References Cited

U.S. PATENT DOCUMENTS

| | | |
|---|---|---|
| 2011/0040550 A1 | 2/2011 | Graber et al. |
| 2011/0040666 A1 | 2/2011 | Crabtree et al. |
| 2011/0046805 A1 | 2/2011 | Bedros et al. |
| 2011/0093493 A1 | 4/2011 | Nair et al. |
| 2011/0113068 A1 | 5/2011 | Ouyang |
| 2011/0125542 A1 | 5/2011 | Koch |
| 2011/0172836 A1 | 7/2011 | Boss et al. |
| 2011/0172838 A1 | 7/2011 | Pai et al. |
| 2011/0196539 A1 | 8/2011 | Nair et al. |
| 2011/0196546 A1 | 8/2011 | Muller et al. |
| 2011/0199209 A1 | 8/2011 | Siddaramanna et al. |
| 2011/0212700 A1 | 9/2011 | Petite |
| 2011/0231320 A1 | 9/2011 | Irving |
| 2011/0258049 A1 | 10/2011 | Ramer et al. |
| 2011/0301774 A1 | 12/2011 | Koch |
| 2012/0066397 A1 | 3/2012 | Koch et al. |
| 2012/0066686 A1 | 3/2012 | Koch |
| 2012/0084696 A1 | 4/2012 | Marti |
| 2012/0093141 A1 | 4/2012 | Imes et al. |
| 2012/0101653 A1 | 4/2012 | Tran |
| 2012/0109399 A1 | 5/2012 | Tran |
| 2012/0136915 A1 | 5/2012 | Koch et al. |
| 2012/0173030 A1 | 7/2012 | Taft |
| 2012/0197456 A1 | 8/2012 | Walter et al. |
| 2012/0197457 A1 | 8/2012 | Walter et al. |
| 2012/0197458 A1 | 8/2012 | Walter et al. |
| 2012/0245968 A1 | 9/2012 | Beaulieu et al. |
| 2012/0271473 A1 | 10/2012 | Koch |
| 2012/0277920 A1 | 11/2012 | Koch |
| 2013/0035992 A1 | 2/2013 | Silverman |
| 2013/0047010 A1 | 2/2013 | Massey et al. |
| 2013/0079931 A1 | 3/2013 | Wanchoo et al. |
| 2013/0123996 A1 | 5/2013 | Matos |
| 2013/0144451 A1 | 6/2013 | Kumar et al. |
| 2013/0173243 A1 | 7/2013 | Kayton et al. |
| 2013/0254151 A1 | 9/2013 | Mohagheghi et al. |
| 2014/0081704 A1 | 3/2014 | Strelec et al. |
| 2014/0149973 A1 | 5/2014 | Walter et al. |
| 2014/0277769 A1 | 9/2014 | Matsuoka et al. |
| 2014/0277795 A1 | 9/2014 | Matsuoka et al. |
| 2014/0278687 A1 | 9/2014 | McConky et al. |
| 2015/0134280 A1 | 5/2015 | Narayan et al. |
| 2015/0170171 A1 | 6/2015 | McCurnin et al. |

FOREIGN PATENT DOCUMENTS

| | | |
|---|---|---|
| WO | WO 2005/033964 | 4/2005 |
| WO | WO 2008/027455 | 3/2008 |
| WO | WO 2008/027457 | 3/2008 |
| WO | WO 2009/006133 | 1/2009 |
| WO | WO 2009/020606 | 2/2009 |
| WO | WO 2009/023230 | 2/2009 |
| WO | WO 2009/027617 | 3/2009 |
| WO | WO 2009/085610 | 7/2009 |
| WO | 2011008775 | 1/2011 |
| WO | WO 2011/065007 | 6/2011 |
| WO | WO 2013/025565 | 2/2013 |
| WO | WO 2013/055551 | 4/2013 |
| WO | 2014036408 | 3/2014 |

OTHER PUBLICATIONS

Couper, "Optimizing Demand Response to Improve Economic Dispatch and Reliability," downloaded from http://public.dhe.ibm.com/common/ssi/ecm/en/euw03026usen/EUW03026USEN.PDF, 5 pages, prior to Dec. 11, 2013.
U.S. Appl. No. 14/931,746, filed Nov. 3, 2015.
U.S. Appl. No. 14/149,301, filed Jan. 7, 2014.
"Executive Summary," 1 page, prior to Sep. 2007.
Federal Energy Regulatory Commission (FERC), "Assessment of Demand Response & Advanced Metering," 92 pages, Sep. 2007.
"Smart Demand Response: A Discussion Paper," Energy Networks Association, energyuk, 44 pages, prior to Nov. 29, 2012.
Abdullah et al., "Demand-Side Energy Management Performed Using Direct Feedback via Mobile Systems: Enables Utilities to Deploy Consumer Based Demand Response Programs," 2010 IEEE International Energy Conference and Exhibition, pp. 172-177, 2010.
Autogrid, "Austin Energy and AutoGrid Systems Collaborate on Standards-Based Automated Demand Response to Usher in a New Era of Retail Choice for the Demand Response Market," 5 pages, Feb. 26, 2013.
European Search Report for Related Application No. EP 12169650.4, Dated Nov. 22, 2012.
International Search Report for PCT ApplicationSerial No. pct/us2012/058537, International Filing Date Oct. 3, 2012.
U.S. Appl. No. 13/939,935, filed Jul. 11, 2013.
U.S. Appl. No. 13/940,043, filed Jul. 11, 2013.
U.S. Appl. No. 13/940,066, filed Jul. 11, 2013.
U.S. Appl. No. 13/940,090, filed Jul. 11, 2013.
U.S. Appl. No. 14/056,902, filed Oct. 17, 2013.
Coughlin et al., "Estimating Demand Response Load Impacts: Evaluation of Baseline Load Models for Non-Residential Buildings in California," Lawrence Berkeley National Laboratory, Report No. LBNL-63728, 33 pages, Jan. 2008.
Cruz, "Tutorial on GPU Computing with an Introduction to CUDA," 37 pages, prior to Nov. 17, 2011.
Holmberg, "Facility Interface to the Smart Grid," National Institute of Standards and Technology, 7 pages, printed 2012.
Honeywell, "Automated Demand Response—Southern California Program," 2 pages, printed Aug. 1, 2011.
Honeywell, "The Perfect Response to Peak Events," 4 pages, Nov. 2010.
http://en.wikipedia.org/wiki/Demand_response, "Demand Response," 10 pages, printed Feb. 3, 2012.
http://www.naesb.org/pdf3/dsmee012308213.doc, "Demand Response Measurement and Verification Literature Review," 29 pages, created Jan. 14, 2008, modified Dec. 18, 2012.
https://buildingsolutions.honeywell.com/Cultures/en-US/Markets/Utilities/DemandResponse/, 1page, printed Feb. 3, 2012.
Hunt, "Automated Demand Response System and Advanced End-Use Services Platform," Optimal Technologies, 31, pages, Sep. 24, 2004.
Kiliccote et al., "Findings from Seven Years of Field Performance Data for Automated Demand Response in Commercial Buildings," Lawrence Berkeley National Laboratory, Report No. LBNL-3643E, May 2010.
Kiliccote et al., "Open Automated Demand Response Communications in Demand Response for Wholesale Ancillary Services," Lawrence Berkeley National Laboratory, Report No. LBNL-2945E, 13 pages, Nov. 2009.
Kiliccote et al., "Open Automated Demand Response for Small Commercial Buildings," Lawrence Berkeley National Laboratory, Report No. LBNL-2195E, 104 pages, Jul. 2009.
Koch et al., "Architecture Concepts and Technical Issues for an Open, Interoperable Automated Demand Response Infrastructure," Berkeley National Laboratory, Report No. LBNL-63664, 7 pages, Oct. 2007.
Koch et al., "Direct Versus Facility Centric Load Control for Automated Demand Response," Lawrence Berkeley National Laboratory, Report No. LBNL-2905E, 11 pages, Nov. 2009.
Koch et al., "Scenarios for Consuming Standardized Automated Demand Response Signals," Lawrence Berkeley National Laboratory, Report No. LBNL-1362E, 10 pages, Nov. 2008.
Koch, "The Demand Response Automation Server (DRAS)," Building Performance, http://www.akuacom.com/assets/pdf/ASHRAE_2008_Ed_Koch.pdf, 18 pages, prior to Nov. 17, 2011.
Olson, "New Approaches in Automating and Optimizing Demand Response to Solve Peak Load Management Problems," Building IQ brochure, 8 pages, 2011.
Piette et al., "Automated Critical Peak Pricing Field Tests: 2006 Pilot Program Description and Results," Berkeley National Laboratory, Report No. LBNL-62218, 67 pages, Aug. 2007.
Piette et al., "Automated Critical Peak Pricing Field Tests: Program Description and Results," Lawrence Berkeley National Laboratory, Report No. LBNL-59351, Apr. 2006.

(56) References Cited

OTHER PUBLICATIONS

Piette et al., "Design and Implementation of an Open, Interoperable Automated Demand Response Infrastructure," Berkeley National Laboratory, Report No. LBNL-63665, 6 pages, Oct. 2007.
Piette et al., "Findings From the 2004 Fully Automated Demand Response Tests in Large Facilities," Lawrence Berkeley National Laboratory, Report No. LBNL-58178, 197 pages, Sep. 2005.
Piette et al., "Linking Continuous Energy Management and Open Automated Demand Response," Lawrence Berkeley National Laboratory, Report No. LBNL-1361E, 9 pages, Nov. 2008.
Piette et al., "Open Automated Demand Response Communications Specification," Version 1.0, CEC-500-2009-063, 214 pages, Apr. 2009.
Piette et al., "Participation through Automation: Fully Automated Critical Peak Pricing in Commercial Buildings," Berkeley National Laboratory, Report No. LBNL-60614, 14 pages, Aug. 13-18, 2006.
Santacana et al., "Getting Smart, With a Clearer Vision of Intelligent Grid, Control Emerges from Chaos," IEEE Power and Energy Magazine, pp. 41-48, Mar./Apr. 2010.
Schisler et al., "The Role of Demand Response in Ancillary Services Markets," IEEE, 3 pages, 2008.
Violette et al., "DRR Valuation and Market Analysis vol. II: Assessing the DRR Benefits and Costs," Summit Blue Consulting, 112 pages, Jan. 6, 2006.
Watson et al., "Machine to Machine (M2M) Technology in Demand Responsive Commercial Buildings," Berkeley National Laboratory, Report No. LBNL-55087, 18 pages, Aug. 2004.
Yin et al., "Auto-DR and Pre-Cooling of Buildings at Tri-City Corporate Center," Lawrence Berkeley National Laboratory, Report No. LBNL-3348, 140 pages, Nov. 2008.
Zaidi et al., "Load Recognition for Automated Demand Response in Microgrids," IEEE, pp. 2436-2439, 2010.
Combined Search and Examination Report Under Sections 17 and 18(3) for Corresponding UK Patent Application Serial No. GB1504192.4 dated Sep. 8, 2015.

\* cited by examiner

SYSTEM FOR PROPAGATING MESSAGES FOR PURPOSES OF DEMAND RESPONSE

BACKGROUND

The present disclosure pertains to pertains to a demand response system, and particularly to communications between a utility and demand response resources.

SUMMARY

The disclosure reveals a system having a utility, a communications intermediary and demand response resources. The utility may be connected to the communications intermediary via a network. The demand response resources may be connected to the communications intermediary via another network. A single dispatch destined for the demand response resources may be sent to the communications intermediary. The dispatch may be disaggregated at the communications intermediary into a multitude of dispatches which may be dispersed to their respective destined demand response resources. The demand response resources may send telemetries to the communications intermediary that aggregates the telemetries into a single telemetry. The single telemetry may be sent to the utility.

DESCRIPTION

Figure 1:
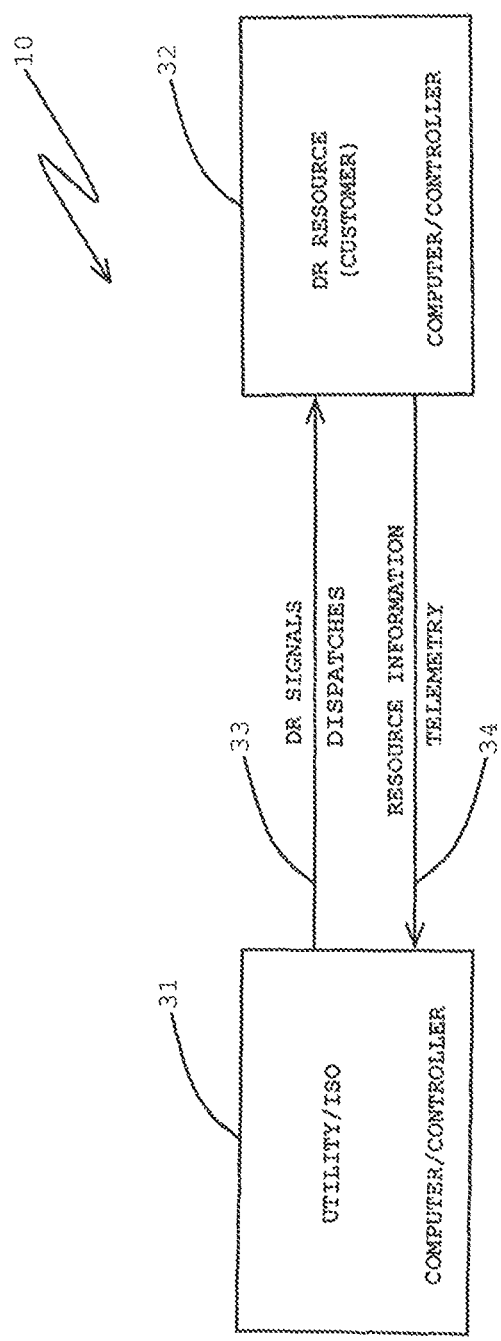
FIG. 1 is a diagram of an example interaction between a utility and a demand response resource.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

An effective resource is especially critical when communities are confronted with a scarcity of a resource in question. It may be noted that "resource" is a term that may have several senses or meanings. "Resource" may refer to energy, commodity, product, load, and so on. In another sense or meaning, "resource" such as a demand response (DR) resource may refer to a customer, a user, facility, and so on. In the first mentioned sense, it may refer to electricity, water, gas and natural resources such as oil. A definition of resource may be extended to include such things such as water quality and air quality. After all, adequate water quality and air quality appear necessary to support a self-sustaining environment.

Resource management, in both senses of "resource", may be necessary so that systems can optimize the use of a limited resource. Currently, there are various systems for managing resources in various environments such as buildings, apartments, industrial facilities, and computing systems.

One mechanism that may be used to encourage customers to reduce demand and thereby reduce the peak demand for electricity may be referred to as demand response (DR). DR may refer to management of the demand by customers in response to supply conditions. For example, electricity customers may reduce their consumption at critical times and/or costs in response to market prices. These customers may be regarded as DR resources.

DR programs may require that a utility and/or independent service operator (ISO) deliver DR signals to participants via a communications channel. The programs may relate to a distribution of resources such as, but not limited to, electricity, water and natural gas.

DR signals may incorporate business level information, such as prices, reliability and shed levels. At some point, from the utility/ISO to loads in a facility, the business level information sent by the utility/ISO should be processed and used to execute a DR strategy and program for the facility.

DR programs may take many forms. They may differ from normal rates and tariffs in that the DR programs are designed to allow the utility/ISO take specific actions to influence the load profiles of facilities that participate in the DR programs at peak consumption times or periods on a grid. The peak consumption periods may cause critical grid reliability issues which should be addressed, but they may also trigger economic factors where the price of electricity or other power commodity reaches a critical level which may be ameliorated by reducing the overall consumption on the grid during those periods. The critical periods, in which the utility/ISO needs to influence a load profile of a facility, may be referred to as DR events.

A manner in which a utility/ISO may influence a load profile of a facility is to send out a DR signal which is specific to the DR event. DR signals may contain information related to business, controlling loads, and so on. There may be an automated DR where the DR signals that are sent out by the utility/ISO are responded to in an automated fashion. Loads within a facility may ultimately be affected by DR events via DR signals to which the facility acts upon or responds. The term "facility" may refer to virtually any location in which there are loads influenced by DR events. Where there are such loads may be regarded as a "DR resource". The term "utility" may be used in a general sense to refer to a utility, independent system operator, service provider, and the like. It may be appropriate to use the term "demand side resource" in order to define a demand response resource.

A computer or controller may incorporate one or more inputs, a processor, a user interface incorporating a keyboard, a display and a touch screen, a memory, external connections such as an internet, one or more outputs, and so forth. The computer may be utilized with virtually all items in and pertinent to FIGS. 1-4.

An implementation of DR signals within a "demand response management system" (DRMS) 10 is shown in a diagram of FIG. 1. System 10 and associated software may be effected and operated with one or more computers/controllers (controllers) 31, 32 and respective connections. The DRMS may be a system that is used by utilities/ISO's to manage the operation of DR programs. A focus of the DRMS may be on the operational aspects of managing the selection, signaling and monitoring of the DR resources that are participating in DR programs. The DRMS may be specifically designed to manage operations of automated DR programs.

There may be various types of interactions that could occur between the utility/ISO and a DR resource as part of a DR program. The diagram in FIG. 1 reveals an example interaction between a utility/ISO 31 and a DR resource (customer) 32. There may be DR signals 33 going from utility/ISO 31 to DR resource 32. There may be DR resource information 34, such as load measurements, going from DR resource 32 to utility/ISO 31. Alternatively, DR signals 33 may be regarded as dispatches 33. Likewise, DR information 34, such as load measurements, may be regarded as telemetry or telemetries 34.

Terms such as customer, client, user, participant, DR resource, and like terms, may be used, interchangeably or distinct from one another, depending on a context of a pertinent portion of a description or a claim.

A description of DR signals 33 may be noted. At a highest level, there may often be some sort of grid condition, be it economic or grid reliability in nature, which triggers a so-called DR event that requires some sort of interaction between the utility/ISO 31 and its customers 32. This interaction may eventually trigger some sort of load control taking place at a customer's facility. The interaction between the utility/ISO 31 and the customer 32 may be mediated by DR signals 33 and DR resource signals 34, i.e., information such as measurements. Signals 33 and 34 may represent communications between utility/ISO 31, and the DR resource or customer 32. Information contained within DR signals 33 may dictate where much of the decision-making takes place relative to, for example, in how the initial grid condition, which triggered the DR event, results in the eventual load control.

Figure 2:
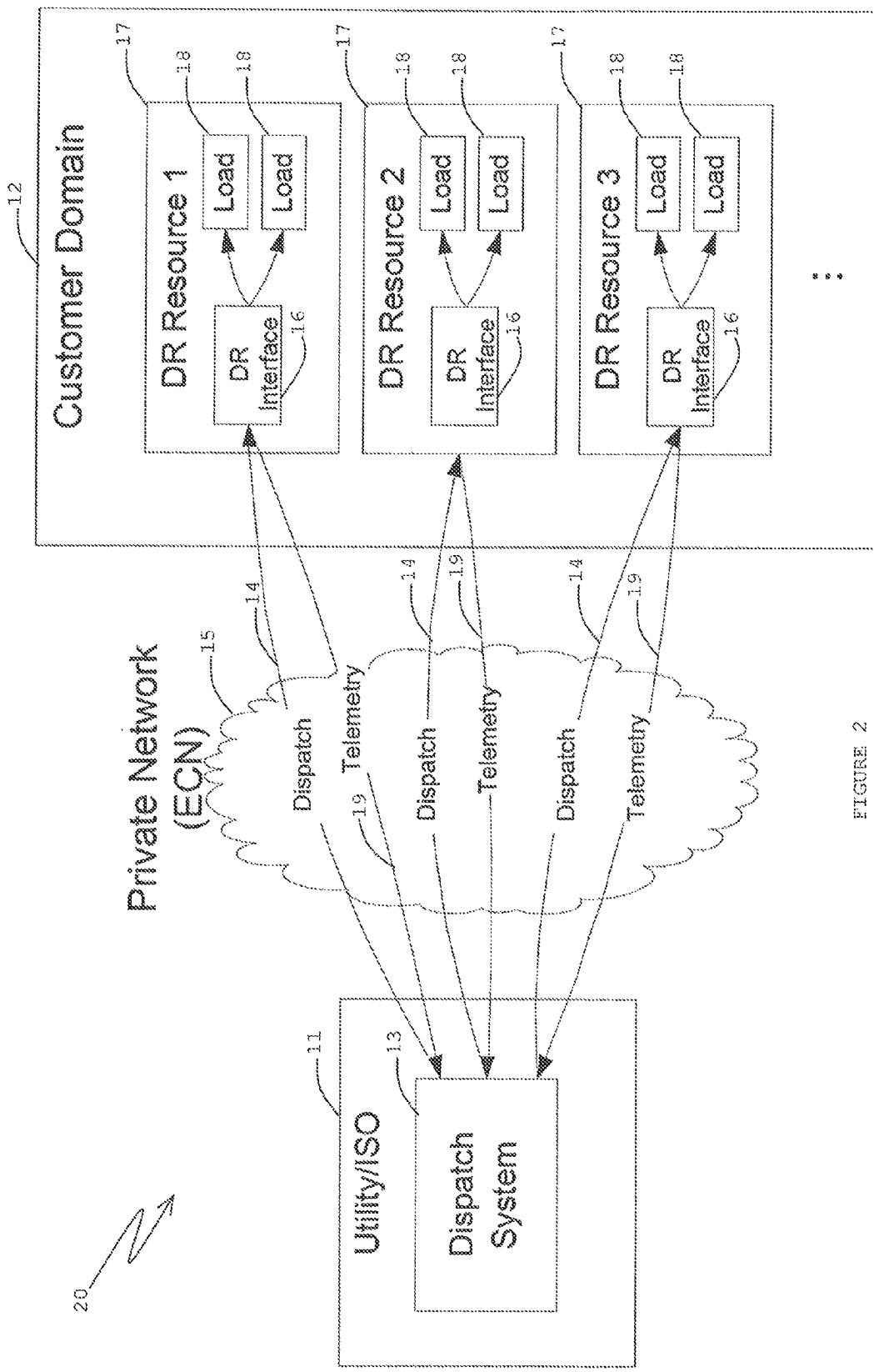
FIG. 2 is a diagram of a demand response system showing an example network connection between a utility and demand response resources of a customer domain.

FIG. 2 is a diagram of a DR system 20 showing an example interface between a utility/ISO 11 and DR resources 17 of a customer domain 12. Utility/ISO 11 may incorporate a dispatch system 13. Dispatch system 13 may send dispatches 14 via a private network 15 to a DR interface 16 of one or more DR resources 17 in customer domain 12. Dispatch 14 may indicate a control of loads 18. A DR resource 17 may in turn send telemetry 19 about, for instance, load 18 usage from interface 16 via network 15 to dispatch system 13 of utility/ISO 11.

Demand response resources 17 may interact with utilities/ISO's 11 in many DR systems. Examples of this way may be so called ancillary services markets in which ISO's 11 can interface customers' resources 17 to their automatic generator control (AGC) systems where the AGC sends dispatches 14 to resources 17 and receives telemetry 19 from the resources 17 in real time. The technical requirements in terms of the protocols (e.g., ICCP, DNP3, OpenADR) and private network interfaces 15 (e.g., ECN) that are used to communicate between the utility/ISO 11 and DR resources 17 may be challenging to implement. In some cases, DR systems 20 may be redesigned to interface to very large generation resources and thus the cost and complexity of the interface could be justified since the cost may be small compared to the size of the resource. As smaller demand side resources become available to be dispatched by a utility/ISO, then what may be needed incorporates a more cost effective way to interface with the resources 17 without making wholesale changes to the existing methodologies used by the utility/ISO 11.

Figure 3:
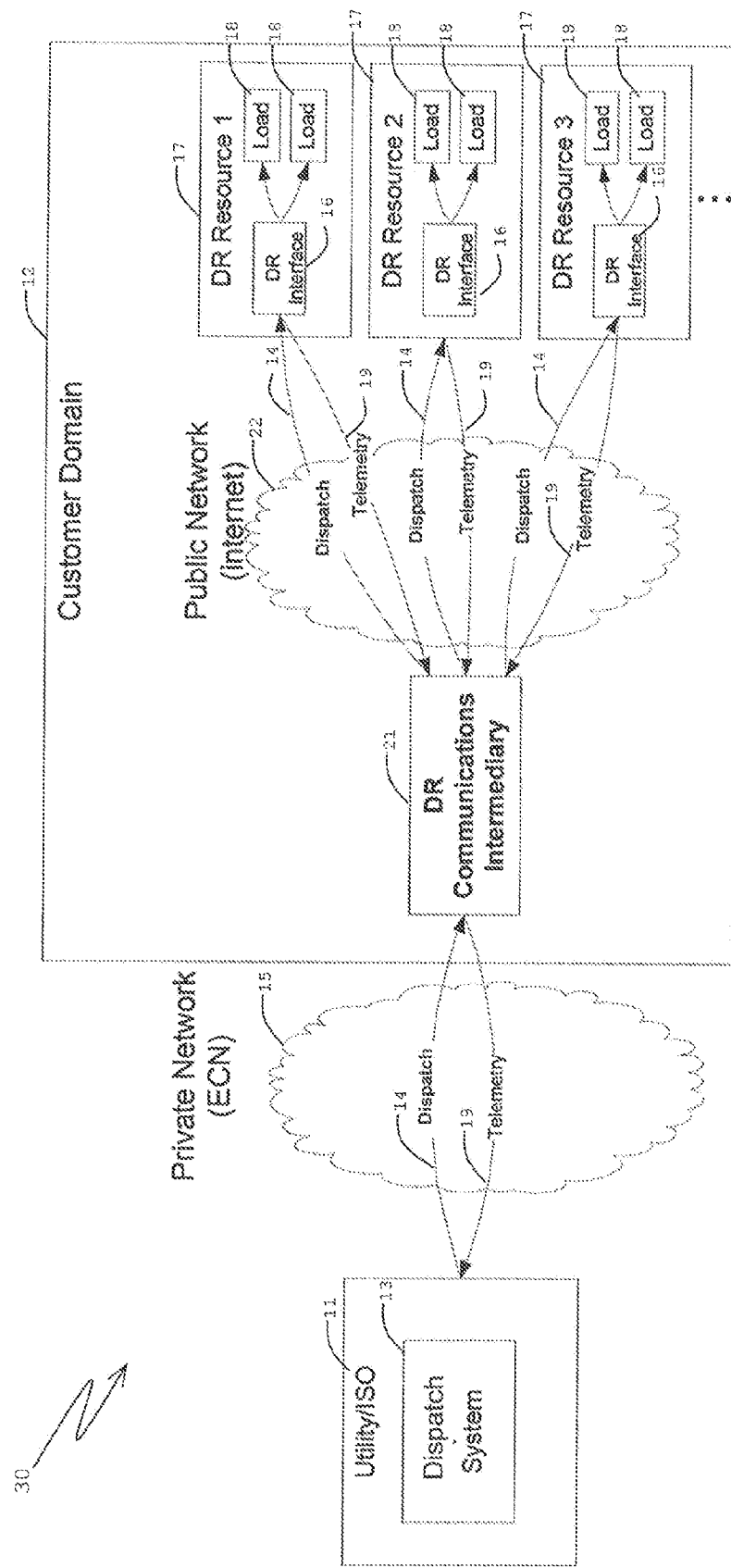
FIG. 3 is a diagram of a demand response system having a communications intermediary between a utility and demand response sources.

FIG. 3 is a diagram of a system 30. System 30 may have a private network 15 that conveys just one dispatch 14 and telemetry 19 from utility/ISO 11 to customer domain 12. Also, a DR communications intermediary (DRCI) mechanism 21 may be added to customer domain 12 which translates dispatch 14 into multiple dispatches 14 and telemetry 19 into multiple telemetries 19. Dispatches 14 and telemetries 19 may go via a public network 22, such as an internet, to and from, respectively, DR interface 16 of each DR resource 17. Public network 22 may have a utility/ISO 11 specific network and protocols. DRCI mechanism 21 may provide for translation between utility/ISO 11 and customer domain 12. Public network 22 may also constitute a customer specific network and protocols. Networks 15 and 22 may be private and public or vice versa. Or networks 15 and 22 may both be private or public. Or only one network 15 or 22 may be incorporate and be private or public. Or there may be more than two networks which are public, private or a combination of private and public. Or there may be no networks incorporated in DR system 30.

System 30 may reveal a more cost effective way for interfacing existing utility/ISO systems 11 to smaller demand side resources 17 that cannot bear the cost and complexity of the existing interface requirements. System 30 may accomplish this by means of DR communications intermediary mechanism 21 that can bear the cost and complexity of a single interface on the utility/ISO 11 side that is translated into multiple interfaces and transactions on the customer side or domain 12 that are lower cost in nature. Thus, the high cost of the single interface on the utility/ISO side may be amortized over the multiple lower cost interfaces on the customer side, making the overall interface to the utility/ISO 11 for each resource more cost effective.

In addition, DR communications intermediary mechanism 21 may be controlled and owned by the customer side entities which enable the addition of value-added functions such as resource aggregation and load response optimization to be performed at the intermediary system.

Examples of customer owned DR resources 17 that may benefit from this architecture incorporate residential customers with communicating thermostats which interface to some vendor's cloud based system via proprietary protocols which in turn may interface to utility/ISO 11 via a single communications interface, and commercial and industrial customers with multiple locations or campuses, virtually all of which may need to communicate with utility/ISO 11 for the purposes of DR.

The diagram of FIG. 3 also reveals architecture within which DR communications intermediary (DRCI) 21 may operate. In general, DRCI mechanism 21 may perform the following items. Mechanism 21 may translate dispatches (DR signals) 14 and telemetries 19 from a protocol used by utility/ISO 11 to one used by the DR resources 17. DRCI mechanism 21 may propagate messages from whatever network or transport approach used by utility/ISO 11 to that used by DR resources 17. DRCI mechanism 21 may also direct DR signals 14 to the appropriate DR resources 17 and furthermore make any modifications to the DR signal that are specific to the respective resource 17.

Figure 4:
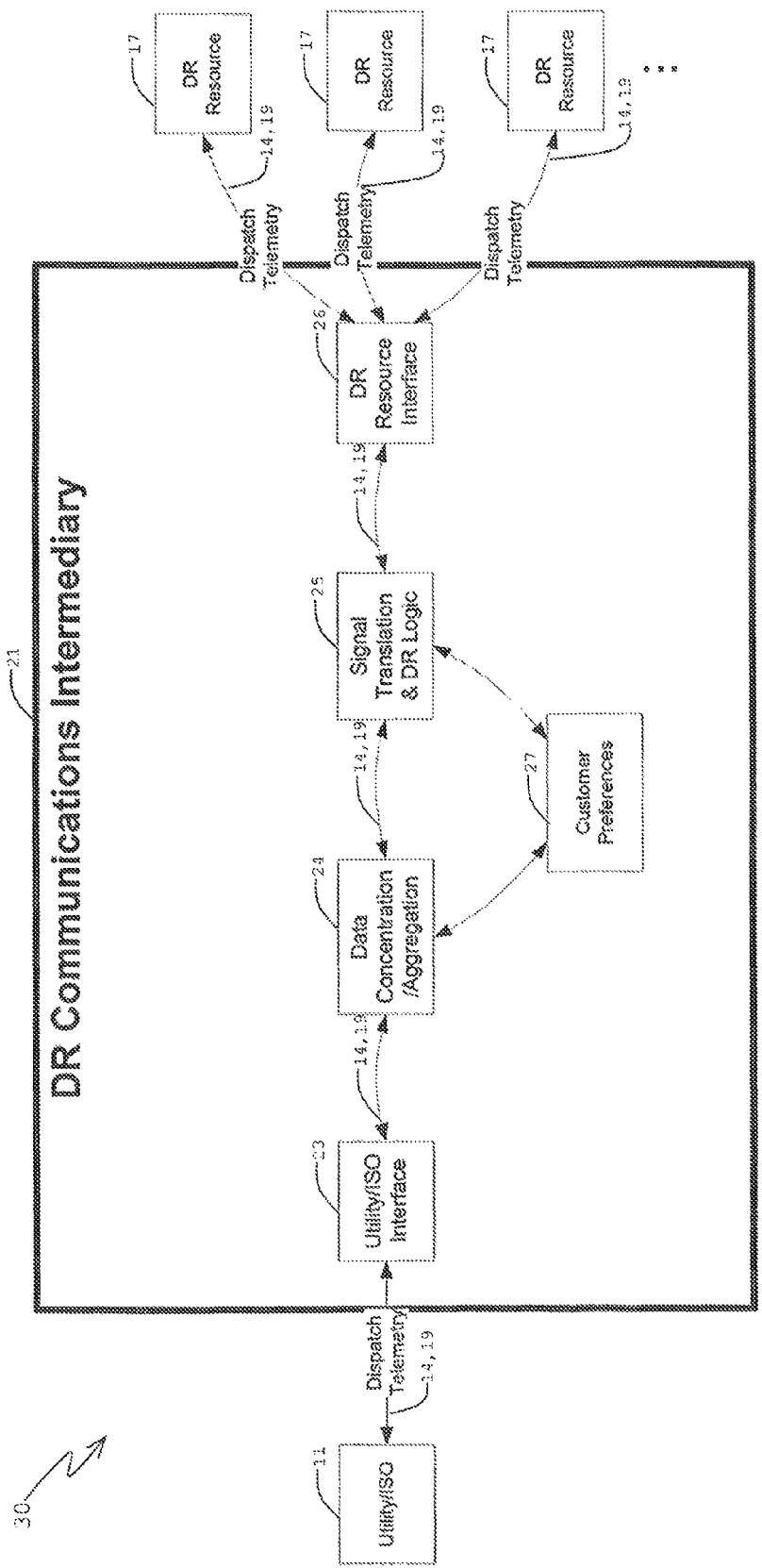
FIG. 4 is a diagram showing components of the communications intermediary.

FIG. 4 is a diagram of the DR system 30 with specifics of DRCI mechanism 21. One or more networks 15 and 22 are not necessarily shown in the Figure. Dispatch 14 and telemetry 19 may proceed between utility/ISO 11 and a utility/ISO interface 23 within DRCI mechanism 21. Dispatch 14 and telemetry 19 may proceed between utility/ISO interface 23 and a data concentration/aggregation module 24, between data concentration/aggregation module 24 and signal translation and DR logic 25, and between signal translation and DR logic 25 and a DR resource interface 26 of DRCI 21. Customer preferences 27 may be provided to data concentration/aggregation module 24 and to signal translation and DR logic 25. Dispatches 14 and telemetries 19 may proceed between DR resource interface 26 and DR resources 17.

A utility/ISO interface 23 may allow DRCI 21 to communicate with the utility/ISO 11 to both receive DR signals 14 and to send telemetry 19. DRCI 21 may use whatever protocol is needed by the utility/ISO 11 to communicate, such as ICCP, DNP3, and OpenADR, among others. In addition, DRCI 21 may use whatever networking technology and infrastructure is needed by utility/ISO 11. In some cases, the technology may be IP communications over the internet, but in other cases it may be a private network such as a so-called "Energy Communications Network" (ECN) used by some ISO's. Various protocols used by utility/ISO 11 may have different ways of modeling and formatting the dispatches or DR signals 14 and DR information or telemetry 19. The utility/ISO 11 may be responsible for translating data to/from the protocols into a form that can be used by DRCI 21 for its various operations.

A data concentration/aggregation module 24 may parse the contents of DR signals or dispatches 14 to determine which DR resource 17 that the signal or dispatch may be targeting and provide any necessary mapping between DR resource 17 identifiers in signal 14 used by utility/ISO 11 to those used by the DRCI 21.

In some cases, DR resources 17 may be explicitly referenced in a DR signal or dispatch 14 by means of an identifier. It may be that a single DR signal 14 may contain references to multiple DR resources 17 such that each of the resources 17 referenced will receive signal 14. Furthermore, all of telemetries 19 received from each of the resources 17 may be transmitted to utility/ISO 11. Also in some cases, separate telemetry 19 messages may be bundled together in order to make the communications with utility/ISO 11 more efficient.

In other cases, DR resources 17 may be implied because of prior agreements between owners of DR resources 17 and utility/ISO 11. An example of this might be where all of DR resources 17 have been aggregated together as a group in some fashion so that only a single DR signal or singular dispatch 14 is sent by utility/ISO 11 to an aggregated group of resources instead of as a separate signal to each individual DR resource 17. In such a case, utility/ISO 11 may then disaggregate such signal and assure that each individual resource of the aggregate group receives a DR signal or dispatch 14. Likewise, DRCI 21 may receive a telemetry 19 from each individual DR resource 17 and aggregate the telemetries from resources 17 together into a single telemetry or stream 19 designated for utility/ISO 11.

Customer preferences 27 may be used to determine how mapping is done between DR signals or dispatches 14 received by the DRCI 21 and DR resources 17 that will receive signals or dispatches 14. For example, there may be a set of configuration parameters that define how DR resources 17 are aggregated together to form an aggregate group.

Signal translation and DR logic 25 may be noted. DR signals 14 sent by utility/ISO 11 may take many general forms such as incentives and/or prices that are intended to influence a DR resource's behavior, and dispatch instructions that indicate an amount of electricity (i.e., power or energy) that each DR resource 17 should be consuming. Sometimes these instructions may give specific power levels and sometimes they may be expressed as an amount of power adjusted either up or down from some baseline. Another form may be explicit load control instructions, such as turning certain devices on or off. Signal translation and DR logic 25 may take a DR signal or dispatch 14 transmitted by the utility/ISO 11 and translate the information contained within it in a manner that is specific to a DR resource 17 that will receive it.

To recap, a demand response message conveyance arrangement may incorporate a demand response (DR) communications intermediary mechanism, a utility/independent service operator (ISO) connectable to the DR communications intermediary mechanism, and two or more DR resources connectable to the DR communications intermediary mechanism.

One or more singular dispatches may be sent by the utility/ISO to the DR communications intermediary mechanism. Each of the one or more singular dispatches may be processed by the DR communications intermediary mechanism into two or more dispatches designated for the two or more DR resources, respectively. Two or more telemetries may be sent by the two or more DR resources, respectively, to the DR communications intermediary. The two or more telemetries may be processed by the DR communications intermediary mechanism into a singular telemetry. The singular telemetry may be sent by the DR communications intermediary to the utility/ISO.

The arrangement may further incorporate a network for conveying a singular dispatch from the utility/ISO to the DR communications intermediary mechanism, and for conveying a singular telepathy from the DR communications intermediary mechanism to the utility/ISO.

The arrangement may further incorporate a network for conveying two or more dispatches from the DR communications intermediary mechanism to the two or more DR resources, respectively, and for conveying two or more telemetries from the two or more resources, respectively, to the DR communications intermediary mechanism.

The DR communications intermediary mechanism may incorporate a first module for disaggregating a singular dispatch into two or more dispatches having identifiers for transmission of the two or more dispatches to two or more DR resources, respectively, according to the identifiers, and a second module for aggregating the two or more telepathies from the two or more DR resources, respectively, into one telepathy for transmission to the utility/ISO.

A dispatch from the utility/ISO may influence a load of a DR resource. A telemetry from a DR resource may provide information about the DR resource to the utility/ISO.

An approach for propagating messages may incorporate providing a utility/independent service operator (ISO), conveying one dispatch from the utility/ISO to a demand response (DR) communications intermediary, disaggregating the one dispatch into one or more dispatches, conveying the one or more dispatches to one or more DR resources, respectively, conveying one or more telemetries from the one or more DR resources, respectively, to the DR communications intermediary, aggregating the one or more telemetries into one telemetry at the DR communications intermediary, and conveying the one telemetry to the utility.

The approach may further incorporate conveying the one dispatch from the utility/ISO to the DR communications intermediary via a network, and conveying the one telemetry from the DR communications intermediary to the utility/ISO via a network. The network may be private or public.

The approach may further incorporate conveying the dispatch from the DR communications intermediary to the one or more DR resources via a network, and conveying the telemetry from the DR communications intermediary via a network. The network may be public or private.

The DR communications intermediary may incorporate a utility/ISO interface connected to the utility/ISO, a data concentration/aggregation module connected to the utility/ISO interface, a signal translation and DR logic connected to the data concentration/aggregation module, and a DR resource interface connected to the signal translation and DR logic and to the one or more DR resources.

The DR communications intermediary may further incorporate a customer preferences module that is connectable to the data concentration/aggregation module.

The customer preferences module may permit a determination of one or more items selected from a group consisting of styles of mapping between the dispatches received by the DR communications intermediary from the utility/ISO and the DR resources that are recipients of the dispatches, and between the telemetries received by the DR communications intermediary from the DR resources and the telemetries received by the utility/ISO.

The one dispatch from the utility/ISO to the DR communications intermediary, may contain one or more references to one or more DR resources. The DR communications intermediary may parse the one or more references contained in the one dispatch such that the one or more DR resources of a reference receive a dispatch containing the reference. The one or more DR resources may send one or more telemetries to the DR communications intermediary. The telemetries may be bundled together by the communications intermediary as one telemetry that is conveyed to the utility/ISO.

A demand response message propagating system may incorporate a utility/independent service operator (ISO), a first network connectable to the utility/ISO, and a customer domain connected to the first network. The customer domain may incorporate a communications intermediary connected to the first network and a second network, and one or more demand response (DR) resources connected to the second network.

A single dispatch may be sent from the utility/ISO to the communications intermediary. A single telemetry may be received by the utility/ISO from the communications intermediary. The single dispatch received by the communications intermediary may be disaggregated at the communications intermediary into one or more separate dispatches and be sent respectively to one or more DR resources. One or more separate telemetries may be received by the communications intermediary from the one or more DR resources. The one or more separate telemetries may be aggregated by the communications intermediary into the single telemetry and sent to the utility/ISO.

The utility/ISO may incorporate a dispatch system which generates and sends the single dispatch and receives and processes the single telemetry. A DR resource may incorporate a DR interface and one or more loads controlled or monitored by the DR interface. The DR interface may receive separate dispatches and send separate telemetries.

The separate dispatches may be sent to the one or more DR resources from the communications intermediary via the second network. The separate telemetries may be sent from the one or more DR resources to the communications intermediary via the second network. The single dispatch may be sent from the utility/ISO to the communications intermediary via the first network. The single telemetry may be sent from the communications intermediary to the utility/ISO via the first network.

The first network may be a private network. The second network may be a public network.

The communications intermediary may incorporate a utility/ISO interface having a connection for a single dispatch from the utility/ISO and a single telemetry to the utility/ISO, a data concentration/aggregation module connected to the utility/ISO interface, a signal translation and DR logic module connected to the data concentration/aggregation module, and a DR resource interface connected to the signal translation and DR logic module and to the one or more DR resources.

The single dispatch from the utility/ISO to the communications intermediary, may contain one or more identifiers of the one or more DR resources, respectively. The communications intermediary may parse the one or more identifiers contained in the single dispatch such that each DR resource of the one or more DR resources of an identifier receives one or more separate dispatches containing the identifier corresponding to the respective DR resource. The one or more DR resources may send one or more separate telemetries to the communications intermediary. The separate telemetries may be bundled together by the communications intermediary into a single telemetry that is conveyed to the utility/ISO.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A demand response message conveyance arrangement comprising:
   a demand response (DR) communications intermediary mechanism;
   a utility/independent service operator (ISO) connectable to the DR communications intermediary mechanism; and
   two or more DR resources connectable to the DR communications intermediary mechanism; and
   wherein:
   one or more singular dispatches are sent by the utility/ISO to the DR communications intermediary mechanism;
   each of the one or more singular dispatches are processed by the DR communications intermediary mechanism into two or more dispatches designated for the two or more DR resources, respectively;
   two or more telemetries are sent by the two or more DR resources, respectively, to the DR communications intermediary;
   the two or more telemetries are processed by the DR communications intermediary mechanism into a singular telemetry; and
   the singular telemetry is sent by the DR communications intermediary to the utility/ISO.

2. The arrangement of claim 1, further comprising a network for conveying a singular dispatch from the utility/ISO to the DR communications intermediary mechanism, and for conveying a singular telepathy from the DR communications intermediary mechanism to the utility/ISO.

3. The arrangement of claim 1, further comprising a network for conveying two or more dispatches from the DR communications intermediary mechanism to the two or more DR resources, respectively, and for conveying two or more telemetries from the two or more resources, respectively, to the DR communications intermediary mechanism.

4. The arrangement of claim 1, wherein the DR communications intermediary mechanism comprises:
a first module for disaggregating a singular dispatch into two or more dispatches having identifiers for transmission of the two or more dispatches to two or more DR resources, respectively, according to the identifiers; and
a second module for aggregating the two or more telepathies from the two or more DR resources, respectively, into one telepathy for transmission to the utility/ISO.

5. The arrangement of claim 4, wherein:
a dispatch from the utility/ISO can influence a load of a DR resource; and
a telemetry from a DR resource can provide information about the DR resource to the utility/ISO.

6. A method for propagating messages comprising:
providing a utility/independent service operator (ISO);
conveying one dispatch from the utility/ISO to a demand response (DR) communications intermediary;
disaggregating the one dispatch into one or more dispatches;
conveying the one or more dispatches to one or more DR resources, respectively;
conveying one or more telemetries from the one or more DR resources, respectively, to the DR communications intermediary;
aggregating the one or more telemetries into one telemetry at the DR communications intermediary; and
conveying the one telemetry to the utility.

7. The method of claim 6, further comprising:
conveying the one dispatch from the utility/ISO to the DR communications intermediary via a network; and
conveying the one telemetry from the DR communications intermediary to the utility/ISO via a network; and
wherein the network is private or public.

8. The method of claim 6, further comprising:
conveying the dispatch from the DR communications intermediary to the one or more DR resources via a network; and
conveying the telemetry from the DR communications intermediary via a network; and
wherein the network is public or private.

9. The method of claim 6, wherein the DR communications intermediary comprises:
a utility/ISO interface connected to the utility/ISO;
a data concentration/aggregation module connected to the utility/ISO interface;
a signal translation and DR logic connected to the data concentration/aggregation module; and
a DR resource interface connected to the signal translation and DR logic and to the one or more DR resources.

10. The method of claim 9, wherein the DR communications intermediary further comprises a customer preferences module that is connectable to the data concentration/aggregation module.

11. The method of claim 10, wherein the customer preferences module permits a determination of one or more items selected from a group consisting of styles of mapping between the dispatches received by the DR communications intermediary from the utility/ISO and the DR resources that are recipients of the dispatches, and between the telemetries received by the DR communications intermediary from the DR resources and the telemetries received by the utility/ISO.

12. The method of claim 6, wherein:
the one dispatch from the utility/ISO to the DR communications intermediary, contains one or more references to one or more DR resources;
the DR communications intermediary parses the one or more references contained in the one dispatch such that the one or more DR resources of a reference receive a dispatch containing the reference;
the one or more DR resources send one or more telemetries to the DR communications intermediary; and
the telemetries are bundled together by the communications intermediary as one telemetry that is conveyed to the utility/ISO.

13. A demand response message propagating system comprising:
a utility/independent service operator (ISO);
a first network connectable to the utility/ISO; and
a customer domain connected to the first network; and
wherein the customer domain comprises:
a communications intermediary connected to the first network and a second network; and
one or more demand response (DR) resources connected to the second network.

14. The system of claim 13, wherein:
a single dispatch is sent from the utility/ISO to the communications intermediary;
a single telemetry is received by the utility/ISO from the communications intermediary;
the single dispatch received by the communications intermediary is disaggregated at the communications intermediary into one or more separate dispatches and are sent respectively to one or more DR resources;
one or more separate telemetries are received by the communications intermediary from the one or more DR resources; and
the one or more separate telemetries are aggregated by the communications intermediary into the single telemetry and sent to the utility/ISO.

15. The system of claim 13, wherein the utility/ISO comprises a dispatch system which generates and sends the single dispatch and receives and processes the single telemetry.

16. The system of claim 14 wherein a DR resource comprises:
a DR interface; and
one or more loads controlled or monitored by the DR interface; and
wherein the DR interface receives separate dispatches and sends separate telemetries.

17. The system of claim 14, wherein:
the separate dispatches are sent to the one or more DR resources from the communications intermediary via the second network;
the separate telemetries are sent from the one or more DR resources to the communications intermediary via the second network;
the single dispatch is sent from the utility/ISO to the communications intermediary via the first network; and
the single telemetry is sent from the communications intermediary to the utility/ISO via the first network.

18. The system of claim 17, wherein:
the first network is a private network; and
the second network is a public network.

19. The system of claim 13, wherein the communications intermediary comprises:
a utility/ISO interface having a connection for a single dispatch from the utility/ISO and a single telemetry to the utility/ISO;

a data concentration/aggregation module connected to the utility/ISO interface;

a signal translation and DR logic module connected to the data concentration/aggregation module; and a DR resource interface connected to the signal translation and DR logic module and to the one or more DR resources.

20. The system of claim 13, wherein:

the single dispatch from the utility/ISO to the communications intermediary, contains one or more identifiers of the one or more DR resources, respectively;

the communications intermediary parses the one or more identifiers contained in the single dispatch such that each DR resource of the one or more DR resources of an identifier receives one or more separate dispatches containing the identifier corresponding to the respective DR resource;

the one or more DR resources send one or more separate telemetries to the communications intermediary; and the separate telemetries are bundled together by the communications intermediary into a single telemetry that is conveyed to the utility/ISO.

\* \* \* \* \*